US006926983B2

(12) United States Patent
Brambilla et al.

(10) Patent No.: US 6,926,983 B2
(45) Date of Patent: Aug. 9, 2005

(54) POLYMERIC MEMBRANE FUEL CELL STACK

(75) Inventors: Massimo Brambilla, Bussero (IT); Gabriele Mazzucchelli, Milan (IT); Gian Piero Fleba, Milan (IT); Antonio Maggiore, Milan (IT)

(73) Assignee: Nuvera Fuel Cells Europe S.r.l. (IT)

( * ) Notice: Subject to any disclaimer, the term of this patent is extended or adjusted under 35 U.S.C. 154(b) by 255 days.

(21) Appl. No.: 10/111,554

(22) PCT Filed: Dec. 1, 2000

(86) PCT No.: PCT/EP00/12099

§ 371 (c)(1),
(2), (4) Date: Apr. 25, 2002

(87) PCT Pub. No.: WO01/41241

PCT Pub. Date: Jun. 7, 2001

(65) Prior Publication Data

US 2003/0099873 A1 May 29, 2003

(30) Foreign Application Priority Data

Dec. 3, 1999 (IT) .......................................... MI99A2531

(51) Int. Cl.[7] .......................... H01M 8/06; H01M 4/86; H01M 8/04
(52) U.S. Cl. .............................. 429/26; 429/19; 429/20; 429/32; 429/34; 429/38; 429/44
(58) Field of Search .............................. 429/19, 20, 26, 429/32, 34, 38, 44, 45

(56) References Cited

U.S. PATENT DOCUMENTS

| 3,061,658 A | | 12/1962 | Blackmer |
| 5,382,478 A | * | 1/1995 | Chow et al. .................. 429/26 |
| 5,482,792 A | | 1/1996 | Faita et al. |
| 5,879,826 A | * | 3/1999 | Lehman et al. ............... 429/13 |

FOREIGN PATENT DOCUMENTS

| EP | 0896379 | 2/1999 |
| EP | 1030396 | 8/2000 |
| JP | 11111311 | 4/1999 |
| WO | 9960640 | 11/1999 |
| WO | 0063992 | 10/2000 |
| WO | 0070698 | 11/2000 |

* cited by examiner

Primary Examiner—Tracy Dove
(74) Attorney, Agent, or Firm—Charles A. Muserlian

(57) ABSTRACT

An improved design of gas fed polymeric membrane fuel cell stack is herein described. The stack is provided with a humidifying device which takes advantage of the atomization of a water stream over a high specific surface metallic material, and with a cooling circuit withdrawing the heat generated therein by thermal exchange on a peripheral region, external to the single cell active area. The device is particularly suited for high temperature and high current density operation.

14 Claims, 6 Drawing Sheets

POLYMERIC MEMBRANE FUEL CELL STACK

This application is a 371 of PCT/EP00/12099 filed Dec. 1, 2000.

BACKGROUND OF THE INVENTION

The invention relates to a polymeric membrane fuel cell stack. Fuel cells are electrochemical generators of direct electric energy; in other words, they convert the free energy of reaction of a fuel (for instance a gaseous mixture containing hydrogen, or light alcohols such as methanol or ethanol) with an oxidant (for instance air or oxygen) without degrading it completely to thermal energy, and therefore without suffering the limitations of Carnot's cycle. Such conversion is achieved through the electrochemical oxidation of the fuel at the negative pole of the cell, with the consequent release of $H^+$ ions, while the oxidant is reduced at the positive pole, wherein such $H^+$ ions are consumed; the migration of said ions from the negative to the positive compartment of the cell takes place through a suitable electrolyte. In the case of polymeric membrane cells, such an electrolyte is constituted of a cation exchange membrane, acting at the same time as a physical separator for the gaseous reactants and as a positive ion conductor, meanwhile presenting a substantially nil electronic conduction, so as to maximise the electromotive force of the generator. The aforementioned half-reactions of fuel oxidation and of oxidant reduction are normally carried out with the help of a catalyst, in intimate contact with the respective sides of the polymeric membrane.

Fuel cells are considered to be an excellent alternative to the traditional systems of electric generation, mostly due to the extremely favourable environmental impact (absence of noxious emissions and noise, release of water as by-product); they are employed both in the field of stationary power generation of various size (electric plants, continuity or emergency power generators, etc.) as well as in the field of mobile applications (electric automotive applications, generation of automotive energy or auxiliary energy for space, submarine and naval applications).

The polymeric membrane fuel cells offer, compared with other fuel cells, further advantages, due to the quick start-up and achievement of the optimum operation conditions, the high power density, the intrinsic reliability connected both to the absence of moving parts and to the absence of corrosion phenomena and heavy thermal cycles from the point of view of materials; in fact among all the fuel cells of the prior art, the polymer electrolyte fuel cells exhibit in absolute the lowest operating temperature (usually, 70–100° C.).

The advantages deriving from the possibility of operating in such conditions go nevertheless together with some limitations, such as the lower activity of the catalysts at low temperature, the extreme vulnerability of the same to carbon monoxide, inevitably present in the hydrogen based fuel mixtures coming from the usual industrial processes, the impossibility of exploiting the generated heat by co-generation systems.

For this reason, one of the most recent trends in this technical field lays in the development of polymeric membranes able to operate at slightly higher temperature (100–150° C.), so as to remarkably reduce the aforementioned drawbacks, without incurring the far heavier ones, in terms of thermal cycles, corrosion phenomena, physical properties of the construction materials, which hinder the use of the high temperature fuel cells (200–800° C.) for low and medium size applications.

Another current trend is the development of membranes capable of working at higher current density at the same cell voltage, i.e. at the same level of electric efficiency of the system. The increase in current density allows in fact to raise the power and energy density of the fuel cell stacks, thereby decreasing the material cost per unity of installed power. This is a very important point for the industrial success of this application, still affected by costs which are not always competitive with those of rival technologies.

A last trend to be taken into consideration concerns the development of fuel cell stacks with gaseous reactants at near-ambient pressure, to decrease the operating costs by using ambient or slightly compressed air. All of the above listed factors lead to increasingly demanding system requirements as far as fuel cell water and thermal management is concerned, those already being two of the most delicate and important aspects in the design of such devices.

It is well known that the former aspect, namely the fuel cell water management, is complicated by two contrasting requirements associated with two vital elements of the system: the ion-exchange membrane, in fact, must be kept in a sufficiently hydrated state so as to develop an adequate ionic conductivity, thereby preventing the onset of resistive penalties that would severely affect the electric efficiency, until completely hindering, in the worst of the cases, the operation of the generator. On the other hand, the catalytic sites on which the two half-reactions take place must be continuously supplied with gaseous reactants for the whole process to be sustained. Such gaseous supply to the catalytic sites can be correctly achieved only if the latter are not covered with a layer of excess liquid water capable of isolating the same, because the diffusion of the gas through such a layer would be so slow that diffusive penalties would arise, again severely affecting the electric efficiency of the whole system.

The water management must take into account the water produced at the positive pole by the cathodic half-reaction, the fraction of the same which migrates by diffusion from the positive to the negative compartment, the water transported by the $H^+$ ions in the hydration shell, and the water withdrawn from the system through the gaseous exhaust outlet. An adequate amount of water must be consequently supplied to each compartment of the cells together with the reactants, in order to compensate for the difference between the overall amount withdrawn and the amount produced. The adoption of more severe process conditions, in terms of operating temperature and of generated current density (the latter being a further source of local heating and increased water evaporation from the ion-exchange membrane) requires, in particular, an increment in the quantity of water to be supplied to the system, which is not easily achieved especially at low pressure, wherein the increased expansion of the gasses increases their volumetric flow at a given molar flow, thereby rising also the capability of the gas flow of withdrawing water from the cells.

The overall thermal balance of a fuel cell is less complex, nevertheless it is associated with technological issues of no lesser extent. The amount of heat produced in a fuel cell operating at high current density is remarkable, and it must be effectively withdrawn to achieve a stable operating temperature, otherwise it would also affect the water management of the system, with a synergistic effect that is not easily reversed after its onset. Moreover, when high temperatures are reached even locally and for a limited time, a structural failing of the membranes, which are among the most expensive components of the whole apparatus, and which are quite difficult to replace without damaging other components of the stacks, can easily occur. It is therefore mandatory to provide an effective system for the heat removal, and the latter, in its turn, should not impart high mass and volume constraints, which would hamper the competitiveness of the system especially for certain kinds of applications (such as in the electric automotive field).

A useful means to temper the extent of problems in heat withdrawal is the selection of materials with a sufficiently high thermal exchange coefficient for fuel cell manufacturing: U.S. Patent 5,482,792,for instance, discloses fuel cell stacks provided with bipolar plates, end-plates and current collectors, whose surfaces are utilized to sustain the thermal exchange, made of metallic materials of various kinds (aluminum and nickel alloys, steels,and so on). The use of high surface reticulated materials as current collectors (metallic foams, sintered materials, overlapping of meshes or expanded sheets) also allows the coupling of the two functions of humidifying the gaseous reactants and withdrawing the generated heat, as disclosed in U.S. patent application Ser. No.: 09/937,973 filed Oct. 1, 2001 now U.S. Pat. No. 6,835,477 wherein fuel cell stacks provided with a dedicated circuit for the injection of water inside single cells equipped with current collectors of this kind are described. The heat is thus withdrawn through the partial evaporation taking place on the material with high specific surface, utilizing the residual fraction of water which is not evaporated, for humidifying the membranes. Such device permits the operation of fuel cell stacks at a higher current density with respect to a conventional system, which may for instance consist in the pre-humidification of the reactants through bubbling the same in appropriate pressurized tanks, while supplying a separate water flow in an independent circuit through suitable grooves provided in the linear part of each bipolar plate.

Such water flows heat withdrawal through the surfaces of such bipolar plates. Not withstanding the manufacturing simplification introduced by the design disclosed in U.S. patent application Ser. No. 937,973, the latter is affected by an evident limitation in terms of operative flexibility, as the humidification of the membranes can only be effected with pure water (at least demineralized), and that this same fluid is deputed to heat withdrawal. It is evident, therefore, that the operation of the generator according to such design in critical conditions of temperature, pressure and current density is affected by the impossibility of utilizing a cooling fluid with improved characteristics.

Patent Application No. PCT/EP 00/04476 discloses an efficient system for pre-humidifying the gaseous reactants to be supplied to a fuel cell stack by means of a device filled with a reticulated metallic material, simultaneously fed with the gas to be humidified and with a calibrated flow of water in the liquid state; this system results more compact and effective than the traditional gas bubblers, nevertheless it cannot perform alone also the cooling of the cell, because the partial evaporation of the water flow takes place far away from the active area of the cell, which is the point where heat is given off. Once supplied to the cells, the completely saturated gaseous flow prevents the evaporation of water from the membrane, the latter remaining thereby well hydrated, but only provided an external means for thermal regulation maintains the cell temperature constant.

The conventional devices for thermal regulation in fuel cell stacks are associated with weights, volumes and costs deriving from manufacturing complications although the use of metallic materials sensibly improves the thermal exchange efficiency. A commonly utilised system for withdrawing the heat of reaction is to provide grooves inside the bipolar plates, through which a suitable coolant is circulated; this implies that the resulting plate has a considerable thickness, in order to allow the housing of the grooves, and that it is complex and also expensive, due to the machining needed for its production. A more convenient solution consists in delimiting, thanks to a suitable gasket, a recess between two smooth and thin shells, put in electric contact by means of metallic inserts to form a bipolar plate; the recess may be conveniently exploited to circulate a coolant therein, and the resulting mechanical complication is limited. However, evident reasons of structural stability still impose a considerable total thickness for each bipolar plate. A method to cool the bipolar plates of a fuel cell stack with increased manufacturing simplicity is known from European Patent Application No. EP 0 896 379. The invention disclosed therein foresees the heat withdrawal from the bipolar plates of a fuel cell stack by circulating a cooling fluid in a peripheral region of such plates, external to the active area. In this way, the thickness of the plates can be drastically reduced, as no circulating means are provided inside such plates. This solution allows an acceptable performance when the process conditions are not too demanding, especially in terms of temperature and current density; in fact, the removal of heat through a peripheral portion of the plates implies that a transversal thermal gradient is set up upon the cell surface: in other words, the innermost region of each cell will be hotter that the outermost ones, and such a phenomenon will have a repercussion on the stability of the polymeric membrane, which will be subject to irregular thermal expansion and possibly to phenomena of local dehydration, which in their turn would result in a downright fall both of the ionic conductivity and of the mechanical properties. All of this introduces an undesirable limitation in cell design in terms of width of the active area, because the bigger is the distance between the centre and the periphery of the cell, the sharper will be the thermal gradient. Furthermore, in order to maintain the innermost region of the membrane at a temperature below the maximum allowed, it is compulsory that the outermost region be maintained at a very low temperature. This last factor causes, in its turn, two important drawbacks: first of all a considerable fraction of the two half-reactions would be carried out at a temperature undesirably low both in terms of catalyst activity and of membrane ionic conductivity; secondly, the circulation of a coolant at too low temperature would prove too demanding for the global economics of the systems, and even unfeasible for certain types of application (e.g. for the automotive traction).

DESCRIPTION OF THE INVENTION

It is an object of the present invention to provide a fuel cell stack provided with bipolar plates and end-plates made of a metallic material, which can be operated in a wide range of process conditions.

It is a further object of the present invention to provide a fuel cell stack provided with bipolar plates and end-plates made of a metallic material characterised by low weight and volume, suitable to be produced without recurring to expensive mechanical machining.

It is a further object of the present invention to provide a design of fuel cell stack adapted for wide active surfaces.

It is a further object of the present invention to provide a fuel cell stack design with a high efficiency humidifying system, and a dual cooling system, partially integrated in the humidifying system and having the possibility of utilising a wide choice of fluids for the thermal regulation.

The invention consists in a stack comprising fuel cells and humidifying cells, piled up in a filter-press type arrangement, mutually separated by metallic plates and connected in electric series by means of the same metallic plates.

The hydraulic sealing between two subsequent plates is achieved by means of frame-shaped and appropriately designed gaskets, each one of which delimiting, on each surface of each plate, a peripheral region, in correspondence of the frame, and a central region, internal to the gasket.

The peripheral region of the plates are provided with holes which, upon piling up the aforementioned components, form manifolds for supplying the gaseous reactants and water, for discharging the exhaust gaseous fraction and for circulating a cooling fluid in a delimited area of the peripheral region.

An appropriate design of the different gaskets allows to determine, for each cell, which of those manifolds are put in communication with the central region of each plate and which are by-passed, according to design procedures which are known and implicit in the concept of filter-press type arrangement.

The central region delimited by each gasket is filled with a reticulated metallic material having a high porosity, preferably not lower than 50%, for instance a metallic foam, a sintered material or an overlapping of meshes or expanded sheets.

Figure 1:
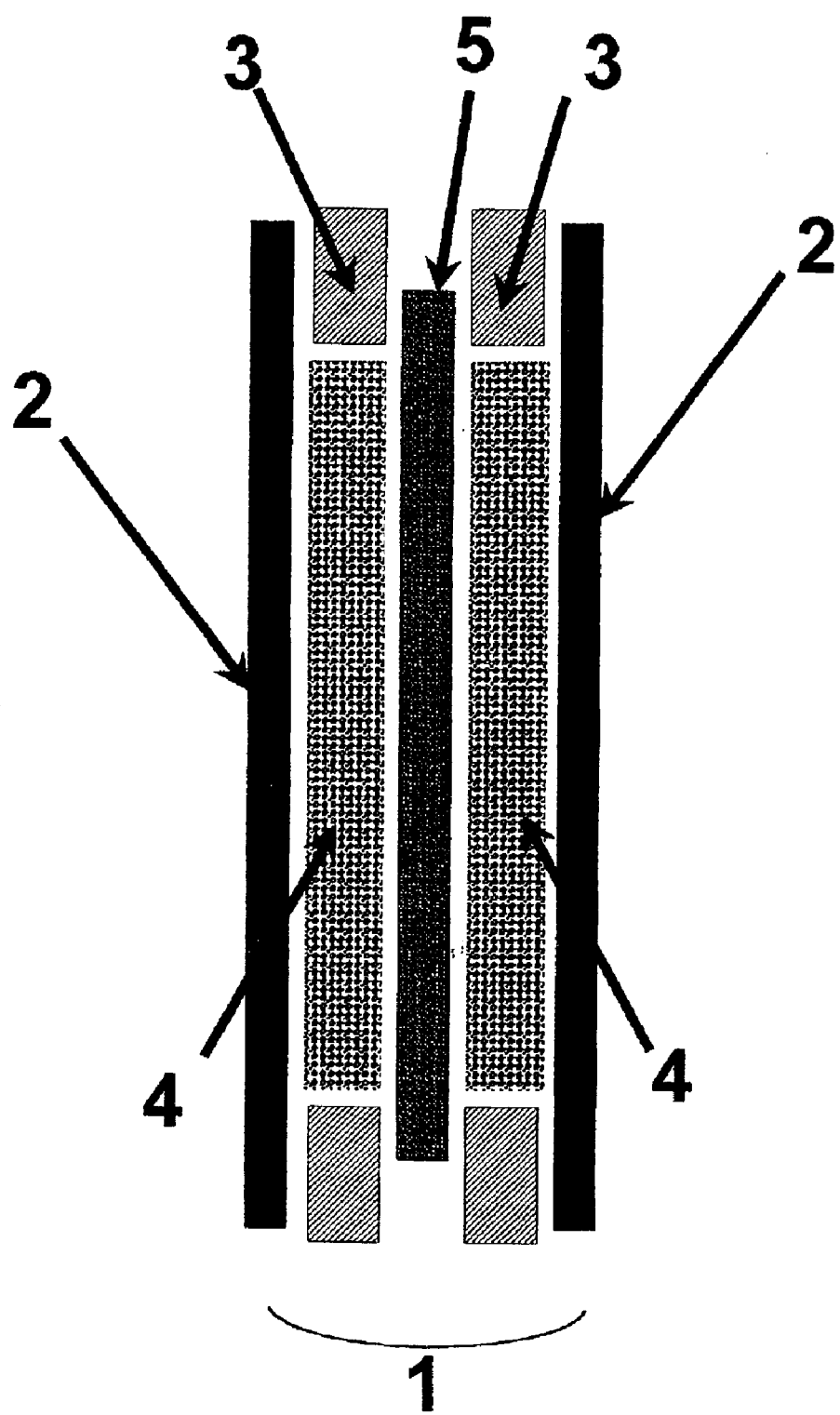
FIG. 1 shows a cross-section of a fuel cell which forms part of the device of the invention.

Making reference to FIG. 1, each fuel cell (1) is delimited by two metallic plates (2) and contains a couple of gaskets (3) whose central region is filled with the aforesaid reticulated metallic material (4), and a membrane (5) whose surfaces are at least in part activated with a catalytic material. As shown in the figure, the reticulated metallic material (4) contacts on one side the surface of the metallic plate (2) adjacent to the corresponding gasket (3), and on the other side a face of the activated membrane (5).

Figure 2:
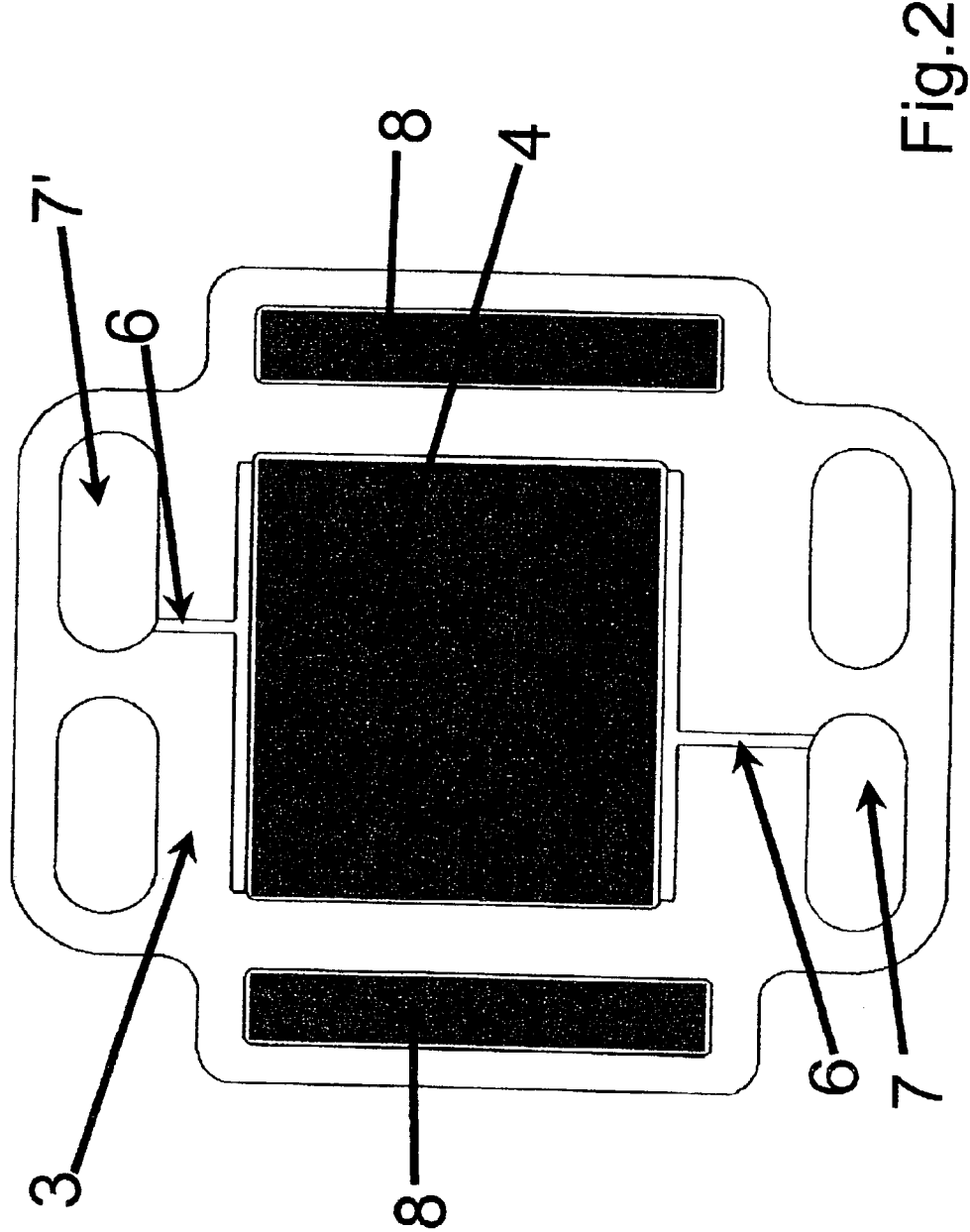
FIG. 2 shows a gasket of a fuel cell which forms part of the device of the invention.

Making reference to FIG. 2, each of the gaskets (3) relative to the fuel cells (1) is provided, in its peripheral region, with channels (6) for feeding a gaseous reactant from the corresponding fuel cell inlet manifold (7') and for the discharging of the exhausts in the corresponding outlet manifold (7), and with at least a hole delimiting at least a region (8) wherein a cooling fluid circulating in the appropriate circuit withdraws heat from the adjacent metallic plate; preferably, at least two cooling regions (8), positioned along two opposite sides of the gasket (3), are present. The regions (8) wherein the cooling fluid circulates may advantageously be filled with a highly porous material with good characteristics of thermal exchange, and preferably with the same material (4) used in the central region of the gaskets (3).

Figure 3:
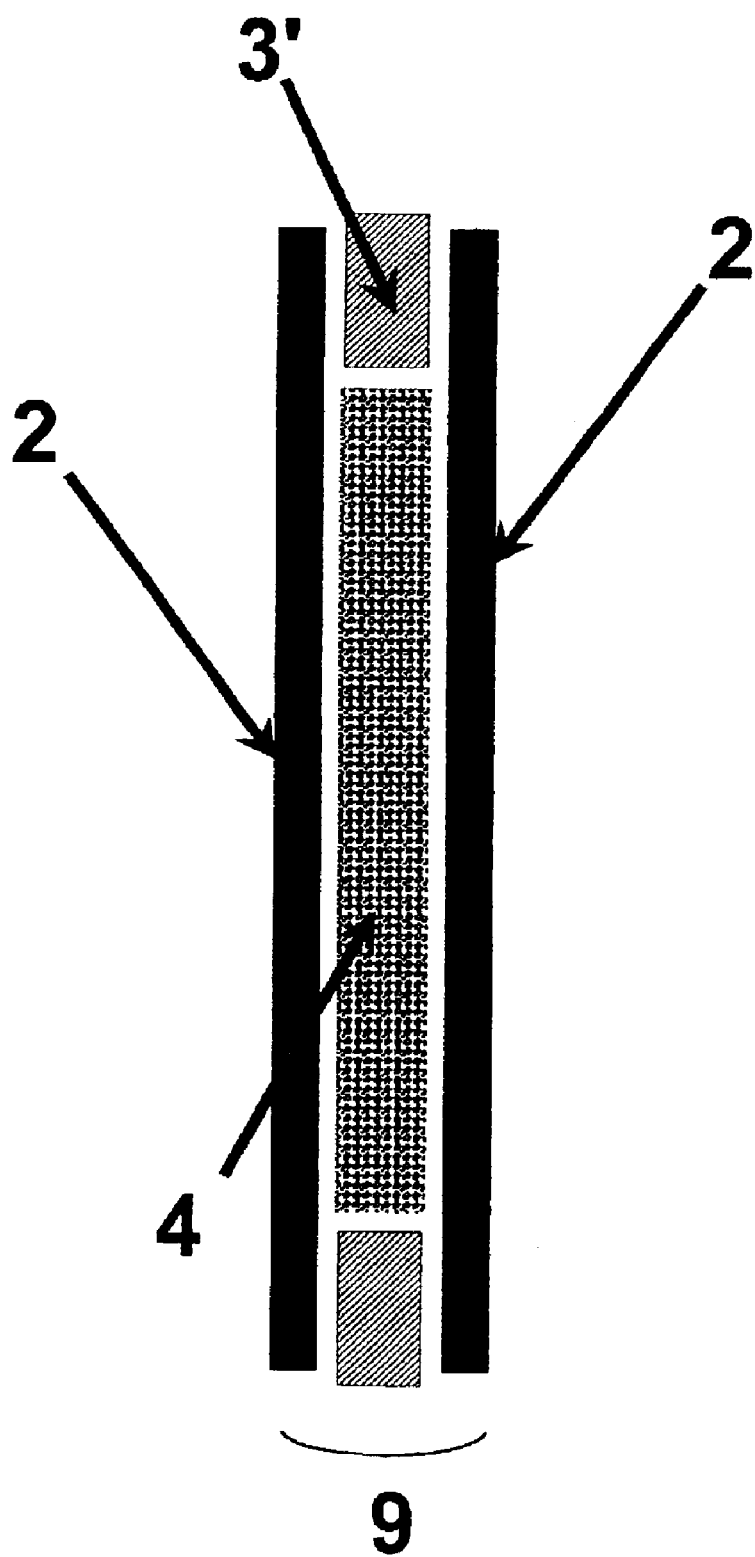
FIG. 3 shows a cut-out view of a humidifying cell which forms part of the device of the invention.

Making reference to FIG. 3, each humidifying cell (9) is delimited by two metallic plates (2) and contains a gasket (3') whose internal region is filled with a reticulated metallic material (4) which puts the two plates (2) in electric contact.

Figure 4:
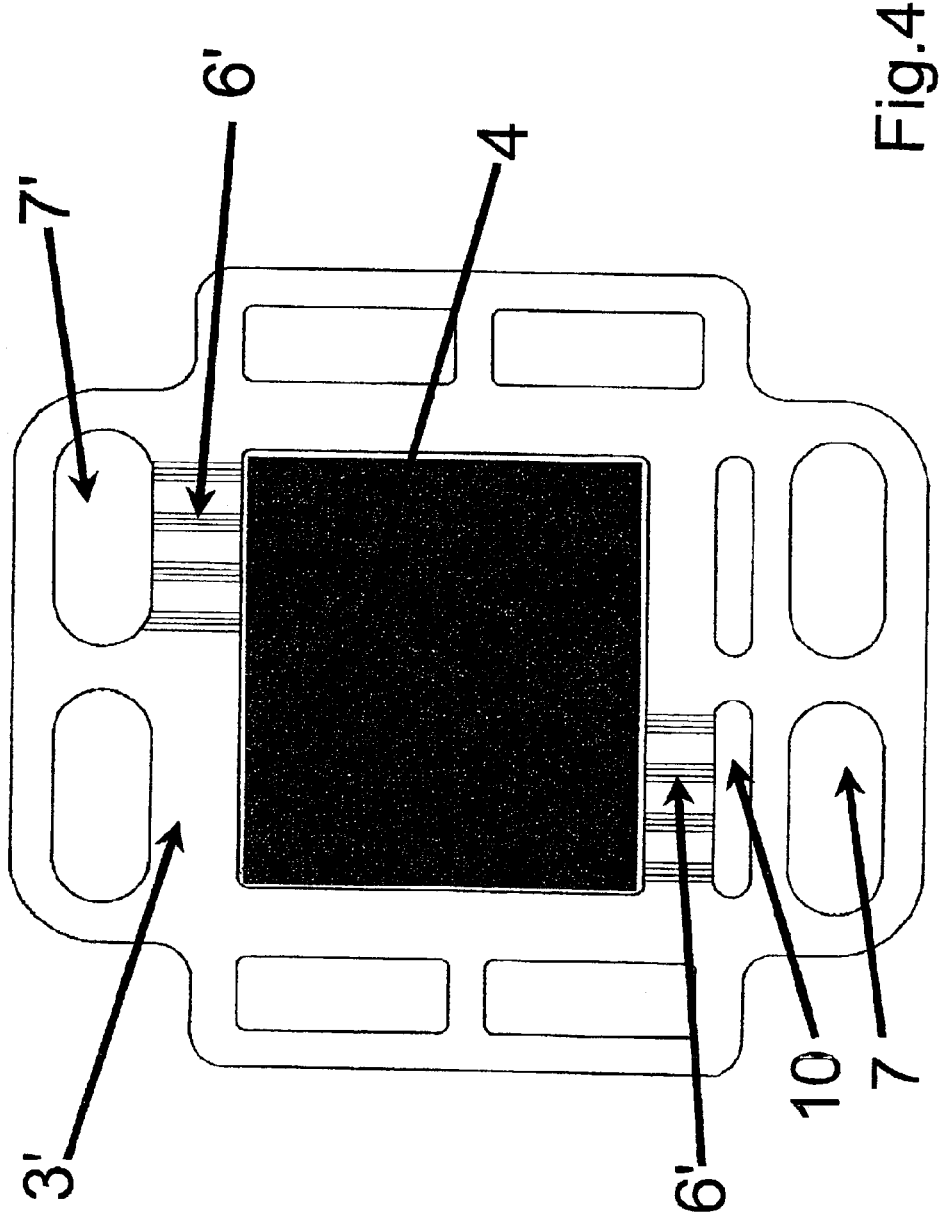
FIG. 4 shows a gasket of a humidifying cell which forms part of the device of the invention.

Making reference to FIG. 4, each gasket (3') is provided, in its peripheral region, with channels (6') for feeding the reactant to be humidified and the water from the corresponding inlet manifold (10), and for supplying the humidified gas into the relative fuel cell inlet manifold (7'); the passage to the outlet manifold (7) for discharging the exhausts is also shown. Each humidifying cell is deputed to the humidification of only one reactant; in case both the fuel and the oxidant must be humidified, separate humidifying cells will have to be provided for the two reactants.

Figure 5:
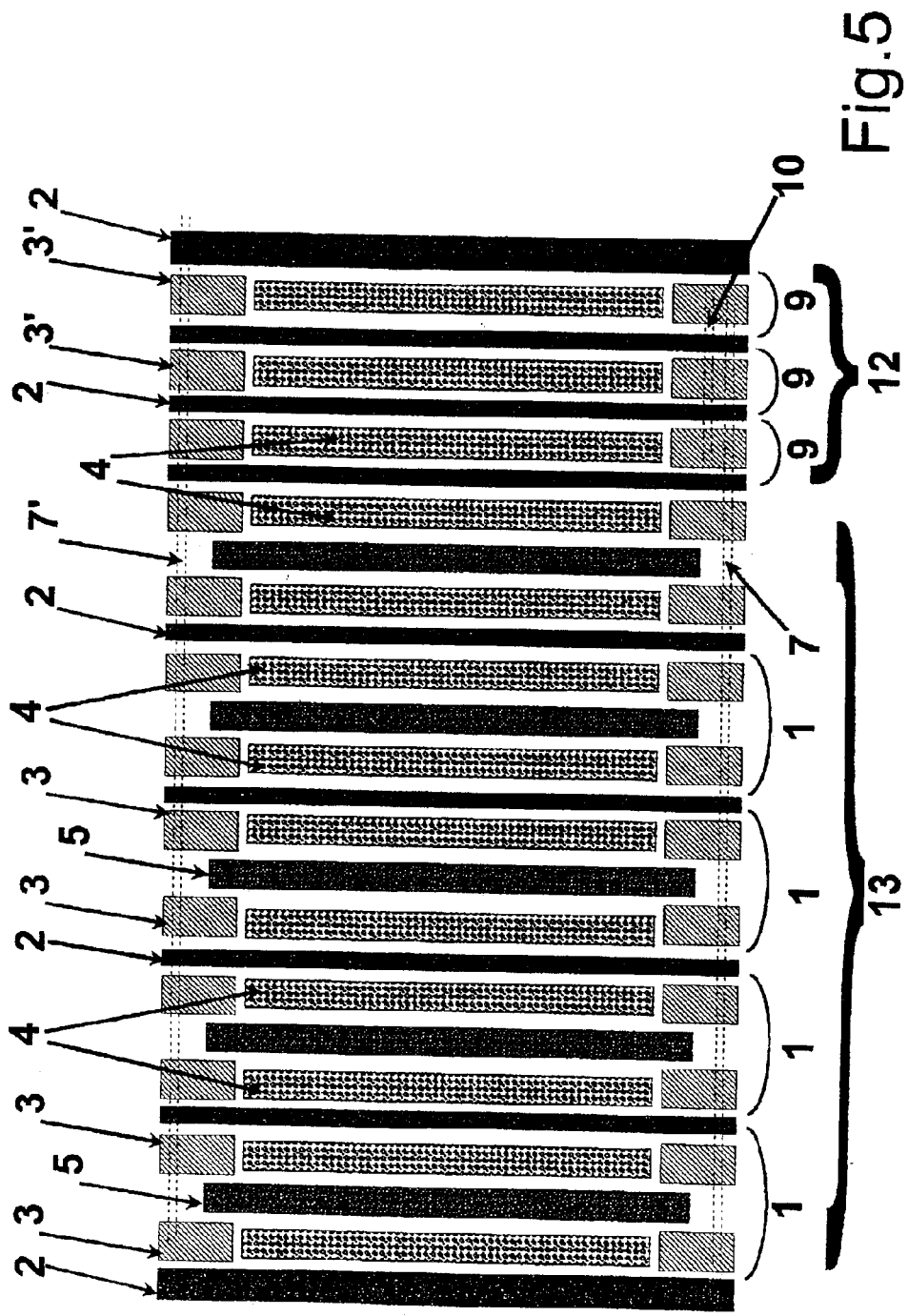
FIG. 5 shows a schematic view of a possible embodiment of the device of the invention, obtained upon piling up fuel cells and humidifying cells, according to a filter-press type geometry.
Figure 6:
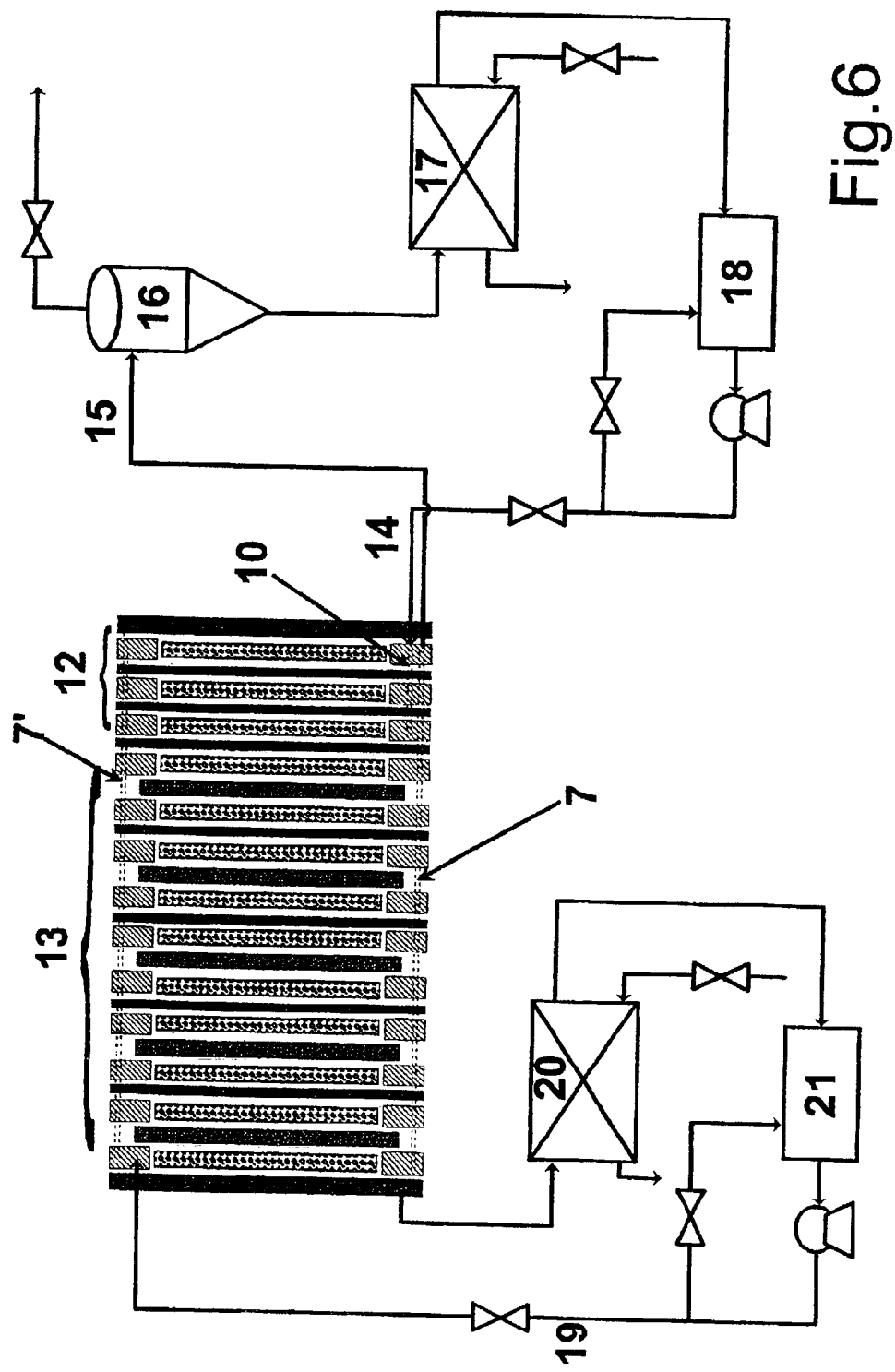
FIG. 6 shows a possible layout for integrating the device of the invention in a plant provided with auxiliary circuits for the thermal regulation and the humidification of the reactants.

FIG. 5 shows a possible arrangement of a stack comprising fuel cells (1) and humidifying cells. (9), according to the invention. Even though in the specific case of FIG. 5 the humidifying cells have been confined at one end of the stack, so as to delimit a humidification section (12) separated from the electric current generation section (13), they may be advantageously distributed according to different modes, for instance be subdivided in two sections at the two ends of the stack, or intercalated between small groups of fuel cells, or grouped in an inner region of the stack. It is nonetheless evident, for one skilled in the art of filter-press type stacks, that the distribution of the humidifying cells (9) in correspondence of one end of the stack offers a particularly preferred solution for an easier design of the manifolds (7) and (7'). FIG. 6 shows, just as an example, a possible layout for integrating the generator assembled according to the particular geometry previously shown in FIG. 5 in a plant provided with the auxiliary circuits for its operation. When different solutions are chosen to distribute the humidifying cells (9) along the modular arrangement constituting the stack, such integration will be subject to the relative modifications, which are part of the conventional knowledge of an expert of the field. In the stack shown in FIG. 6, the humidifying section (12) is fed with an oxidant, for instance with air, as well as with water through the corresponding channel (10) housed in the humidification gasket (3'). The air feed, not shown, can be effected through a compressor, a fan or other equivalent media. According to this layout, the exhaust air leaving the generator through the corresponding manifold (7) is fed through an external line (15) to a separator (16); the liquid fraction is then conveyed into a heat exchanger (17) and reaches a collecting tank (18), wherein, if required, the reintegration of the water lost in the overall cycle may also be effected; from the collecting tank (18), the water is pumped into the humidification section (12) through the line (14).

A similar circuit can be provided also for the humidification of the fuel.

A separate cooling circuit (19), provided with a heat exchanger (20) and a collecting tank (21) feeds in its turn the fuel cells section (13) through the hole in the gaskets (3) which allows the thermal exchange of the chosen cooling fluid with the cooling zones ((8) in FIG. 2) preferably filled with a high surface metallic material.

As shown in the above figures, according to the present invention, the humidifying cells (9) are supplied through the relative channels (6') with the gas that has to be humidified, and with a flow of water in excess with respect to the amount which is needed to saturate the supplied gas. The simultaneous presence of gas and water on the high surface reticulated material (4) ensures the complete saturation of the gas, while the excess water is dragged in the liquid phase through the outlet channels (6'). This mixture of saturated gas and water is then supplied to the fuel cells (1) through the corresponding manifold (7'). This system may be used to humidify both reactants or just one; for instance, for fuel cells fed with pure hydrogen and air, it may be convenient to humidify just the latter, avoiding to humidify the former. The fuel cells (1) are partially cooled by means of the circulation of an appropriate cooling fluid which extracts the heat in correspondence of the cooling regions ((8) in FIG. 2); as it's evident, the choice of the appropriate fluid is a function of the process conditions, especially of the working temperature. It is possible, for instance, to make use of water, of oils, alcohols, glycols or other means known in the art.

The withdrawal of heat in correspondence of the cooling regions (8) is effective only for a portion of the active area relatively close to the peripheral region; a transversal profile of temperature, as aforesaid, would thus set up, wherein the innermost region of the cell should tend to overheat.

Nevertheless it has surprisingly been found that the water dragged in the liquid state from the humidifying cells (9) to the fuel cells (1), upon reaching the innermost and hotter region of the filling material (4), undergoes local evaporation, absorbing the corresponding latent heat and contributing to the cooling of such innermost region, and to maintaining that gas flow saturated therein. This dual cooling mechanism achieved by the two distinct fluids, in the innermost and near the peripheral region, shows surprising self-regulating characteristics, probably due to the fact that, wherever the thermal gradient tends to accentuate, for instance due to an increase in the generated current density, the amount of water which evaporates in the innermost region of the cell tends also to increase, thereby extracting more heat. This characteristic is even more desirable when a variable electric load is employed, as is again the case of fuel cells for automotive applications, which must be capable to respond to peaks in the power demand sometimes very pronounced, in correspondence of accelerations or high slopes. The above described self-regulating cooling system allows a stable operation also in very critical conditions, provided the excess water supplied to the humidifying cells (9) is sufficient not only as a global amount, but also locally, for each single fuel cell (1). To make sure that this is properly achieved, it is important to prevent local condensation phenomena in the fuel cell inlet manifold (7'), which thus must be preferably maintained at a uniform temperature. The fuel cell inlet manifolds (7') obtained juxtaposing holes in metallic plates (2) present the disadvantage of having metallic walls, therefore subjected to a heavy thermal exchange. It is particularly advantageous to insulate the whole thickness of the plates in correspondence of such holes with an appropriate material, for instance a plastic material, so that any phenomena of local condensation leaving part of the fuel cells (1) in water starvation are prevented. The easiest and cheapest way for achieving the required thermal insulation is to insert a pipe of plastic material or of other thermally insulating material, provided with suitable holes, inside the inlet manifold (7), so as to cover completely its inner wall. With this simple expedient, the above disclosed integrated humidifying and cooling system is capable of allowing the operation of a fuel cell stack even in extremely severe process conditions, minimising the performance gap between single cells, also for big sized modules, as better explicited in the following examples.

EXAMPLE 1

A device corresponding to the layout of FIG. 5, comprising 25 fuel cells in electrical series of 0.1 $m^2$ active area, and 5 humidifying cells, located at one end of the filter-press arrangement so as to constitute a separate humidification section, has been assembled; the filter-press arrangement has been set up so that all of the five humidifying cells were deputed to the humidification of the same reagent to be supplied in the device. The fuel cells comprised 2 mm thick gaskets according to the teaching of FIG. 2, and a filling material made of a 2 mm thick nickel-chromium foam of 50% porosity.

The same filling material has been employed for the gaskets of the humidification section, also having a thickness of 2 mm.

The stack so obtained has been operated with a dead-end supply of pure hydrogen (i.e. without any recirculation, wherein the amount of hydrogen consumed by the reaction is continuously reintegrated by the pressure balance; only a periodic purge was used to discharge inerts which accumulate during operation) and with filtered and compressed ambient air. The air flow was twice the stoichiometric requirement, and the exhaust was vented to the atmosphere. The device has been connected to a cooling circuit according to the teaching of FIG. 6, comprising a recirculation pump, a collecting tank and a heat exchanger. In contrast to what shown in FIG. 5, however, the gas supply by-passed the humidifying cells, and the air coming from the compressor was instead saturated by bubbling in a thermostated tank at 90° C., maintained at the same pressure of the cathodic compartment of the fuel cell stack plus the compensation for the pressure drop. A constant flow (4 $m^3$/h) of demineralised water at 50° C. was circulated in the cooling circuit. Both reactants were kept at 2 bar abs. A variable resistive load was used to control the current output; the current density has been thus progressively increased, until determining the maximum current density at which a stable operation was possible, with single cell voltages not lower than 0.4 V. In these conditions, the device has generated electric current in a stable mode up to a current density of 650 mA/$cm^2$; at higher current density, the voltage of some cells tended to decrease sharply, probably as an effect of local overheating. Increasing the cooling water flow up to 18 $m^3$/h has given no appreciable result. In this kind of situation, there's the risk that the cell voltage of one or more cells even reverts its sign, so that such cells work as water electrolysers under the voltage impressed by the adjacent cells, with the chance that hydrogen evolves in the air fed compartment; moreover, the local overheating phenomena could lead to a brisk structural breakdown of the interested membranes, with the risk of a sudden mixing of the two reactants. The test was thus rapidly shut-down.

EXAMPLE 2

The generator of the previous example was connected to the plant illustrated in FIG. 6. The experiment of the previous example was repeated with two variations: the compressed air has not been previously saturated in a bubbling tank, but supplied instead into the humidification section of the device, together with a 30 l/h water flow. Furthermore, the cooling circuit has not been used. In such conditions, the device was able to generate, in a stable fashion, a current density of 200 mA/$cm^2$; increasing the water flow in the humidification section, a parallel increment in the generated current density was also possible, up to 380 mA/$cm^2$ with 72 l/h of water. Beyond this current density level, increasing the water flow had no more visible effect, and the test was shut-down due to a sharp voltage fall on several fuel cells of the device.

EXAMPLE 3

The test of the example 3 has been repeated, with the only change that the cooling circuit was put in operation, with demineralised water at 50° C. and with a constant flow of 4 m³/h. Feeding 72 l/h of water in the humidification section, a stable current density of 1050 mA/cm² was maintained, with an average cell voltage of 0.42 V, and a minimum single cell voltage of 0.4 V, during nine hours of continuous operation.

EXAMPLE 4

The experiment of example 3 was repeated, after inserting a PTFE pipe with appropriate holes into the air inlet manifold, so as to favour the thermal insulation of the latter, preventing an excessive condensation of water on its walls. In these conditions, a stable current density of 1200 mA/cm² was maintained, with an average cell voltage of 0.41 V, ad a minimum single cell voltage of 0.4 V, during nine hours of continuous operation.

The above disclosed examples and the particular embodiments shown in the figures must be intended as an illustration of the principles of the present invention, and should not be construed as a limitation of its scope, whose extent is solely defined by the appended claims.

What is claimed is:

1. A fuel cell stack comprising:
   polymeric membrane fuel cells delimited by metallic plates and supplied with gaseous reactants, and
   humidifying cells delimited by metallic plates deputed to the humidification of at least one of said gaseous reactants;
   wherein the fuel cells are provided with gaskets delimiting at least a cell active area housing a first reticulated metallic material, and
   wherein a fraction of the heat generated by the fuel cells is extracted through a cooling region which passes through a peripheral region of the gaskets and a peripheral region of the metallic plates, said cooling region extracts the fraction of heat generated by the fuel cells by means of circulation of at least one circulating fluid only for a peripheral portion of said active area; and
   a remaining fraction of said heat is extracted by means of the evaporation of liquid water contained in the at least one of said gaseous reactants present in the fuel cells and deputed to humidification in the humidifying cells, wherein the remaining reaction of said heat is extracted from an inner region of said active area.

2. The fuel cell stack of claim 1, wherein said metallic plates delimiting the fuel cells is adjacent to said cell active area.

3. The fuel cell stack of claim 2, wherein said peripheral region of said metallic plates through which said at least one circulating fluid extracts said fraction of heat contains a second reticulated metallic material having a high porosity.

4. The fuel cell stack of claim 3, wherein the humidifying cells are provided with second gaskets housing a third reticulated metallic material having a high porosity.

5. The fuel cell stack of claim 4, wherein the humidifying cells are fed with an amount of water in excess of the amount required for the saturation of said at least one of said gaseous reactants.

6. The fuel cell stack of claim 4, wherein said first, second and third reticulated metallic materials are selected from the group consisting of metal foams, sintered materials, meshes, expanded sheets and any combination obtained by juxtaposition of at least two elements thereof.

7. The fuel cell stack of claim 4, wherein said first, second and third reticulated metallic materials comprise nickel or nickel alloy.

8. The fuel cell stack of claim 1, wherein the cells deputed to the humidification of at least one of said gaseous reactants are deputed to the humidification of an oxygen-containing oxidant.

9. The fuel cell stack of claim 8, wherein said oxygen-containing oxidant is ambient air.

10. The fuel cell stack of claim 1, wherein the cells deputed to the humidification of at least one of said gaseous reactants are deputed to the humidification of a hydrogen-containing fuel.

11. A fuel cell stack comprising:
    polymeric membrane fuel cells delimited by metallic plates and supplied with gaseous reactants, and
    humidifying cells delimited by metallic plates deputed to the humidification of at least one of said gaseous reactants;
    wherein the fuel cells are provided with gaskets delimiting at least a cell active area housing a first reticulated metallic material, and
    wherein a fraction of the heat generated by the fuel cells is extracted through a cooling region which passes through a peripheral region of the gaskets and a peripheral region of the metallic plates, said cooling region extracts the heat generated by the fuel cells by means of circulation of at least one circulating fluid only for a peripheral portion of said active area; and
    a remaining fraction of said heat is extracted by means of the evaporation of liquid water contained in the at least one of said gaseous reactants present in the fuel cells and deputed to humidification in the humidifying cells, wherein the remaining reaction of said heat is extracted from an inner region of said active area, and
    wherein a manifold is formed by juxtaposition of holes in the metallic plates delimiting the fuel cells according to a filter-press arrangement, and that thermal insulation of inner walls of said manifold is achieved by means of the insertion of a pipe made of a thermally insulating material.

12. A fuel cell stack comprising:
    polymeric membrane fuel cells delimited by metallic plates and supplied with gaseous reactants, and
    humidifying cells delimited by metallic plates deputed to the humidification of at least one of said gaseous reactants;
    wherein the fuel cells are provided with gaskets delimiting at least a cell active area housing a first reticulated metallic material, and
    wherein a fraction of the heat generated by the fuel cells is extracted through a cooling region which passes through a peripheral region of the gaskets and a peripheral region of the metallic plates, said cooling region extracts the heat generated by the fuel cells by means of circulation of at least one circulating fluid only for a peripheral portion of said active area; and
    a remaining fraction of said heat is extracted by means of the evaporation of liquid water contained in the at least one of said gaseous reactants present in the fuel cells and deputed to humidification in the humidifying cells, wherein the remaining reaction of said heat is extracted from an inner region of said active area, and wherein the cells deputed to the humidification of at least one of said gaseous reactants are fed with said at least one of said gaseous reactants and with water through a manifold having thermally insulated inner walls.

13. The fuel cell stack of claim 12, wherein said manifold is obtained by juxtaposition of holes in the metallic plates delimiting the fuel cells according to a filter-press arrangement and the thermally insulated inner walls of said manifold are formed by means of the insertion of a pipe made of a thermally insulating material.

14. A fuel cell stack comprising:

polymeric membrane fuel cells delimited by metallic plates and supplied with gaseous reactants, and humidifying cells delimited by metallic plates deputed to the humidification of at least one of said gaseous reactants;

wherein the fuel cells are provided with gaskets delimiting at least a cell active area housing a first reticulated metallic material, and wherein a fraction of the heat generated by the fuel cells is extracted through a cooling region which passes through a peripheral region of the gaskets and a peripheral region of the metallic plates, said cooling region extracts the heat generated by the fuel cells by means of circulation of at least one circulating fluid only for a peripheral portion of said active area; and a remaining fraction of said heat is extracted by means of the evaporation of liquid water contained in the at least one of said gaseous reactants present in the fuel cells and deputed to humidification in the humidifying cells, wherein the remaining reaction of said heat is extracted from an inner region of said active area, and the at least one of said gaseous reactants humidified in the humidifying cells is subsequently supplied to a manifold having thermally insulated inner walls.

* * * * *